US007630066B2

(12) United States Patent  
Kachmar

(10) Patent No.: US 7,630,066 B2  
(45) Date of Patent: Dec. 8, 2009

(54) OPTICAL FIBER INSPECTION TOOL

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 217 days.

(21) Appl. No.: 11/694,614

(22) Filed: Mar. 30, 2007

(65) Prior Publication Data

US 2008/0239296 A1 Oct. 2, 2008

(51) Int. Cl.  
*G01N 21/00* (2006.01)

(52) U.S. Cl. ...................... 356/73.1; 356/440

(58) Field of Classification Search ............... 356/73.1, 356/244, 440, 241.1–241.6; 269/71, 77, 269/78, 82, 903; 451/65, 41, 378, 384, 386, 451/391, 70; 359/309, 365, 387, 394, 801, 359/379, 385, 391, 393; 385/56  
See application file for complete search history.

(56) References Cited

U.S. PATENT DOCUMENTS

| | | | |
|---|---|---|---|
| 4,505,556 A | 3/1985 | Bridson et al. | |
| 4,527,870 A | 7/1985 | Esmay | |
| 4,571,037 A | 2/1986 | Esmay | |
| 4,595,265 A | 6/1986 | Hodgson et al. | |
| 4,671,629 A | 6/1987 | Doyle | |
| 5,567,203 A | 10/1996 | Euteneuer et al. | |
| 5,724,127 A | 3/1998 | Csipkes et al. | |
| 5,731,893 A | 3/1998 | Dominique | |
| 5,813,902 A | 9/1998 | Wiegand | |
| 5,982,533 A | 11/1999 | Dominique | |
| 6,078,719 A | 6/2000 | Wiegand et al. | |
| 6,412,987 B1 | 7/2002 | Horwitz et al. | |
| 6,578,747 B2 | 6/2003 | Murgatroyd | |
| 6,668,128 B2 | 12/2003 | Hattori et al. | |
| 6,859,589 B2 | 2/2005 | Taylor et al. | |
| 6,892,013 B2 | 5/2005 | Furman et al. | |
| 7,042,577 B1 | 5/2006 | Jacob et al. | |
| 7,128,471 B2 | 10/2006 | Wilson | |
| 7,147,490 B2 | 12/2006 | Gerhard | |

FOREIGN PATENT DOCUMENTS

| | | |
|---|---|---|
| EP | 1184695 | 8/2001 |
| JP | 2004-354228 | 12/2004 |

*Primary Examiner*—Gregory J Toatley, Jr.  
*Assistant Examiner*—Tri T Ton  
(74) *Attorney, Agent, or Firm*—Merchant & Gould P.C.

(57) ABSTRACT

An optical fiber inspection device includes a housing, wherein the housing defines an opening disposed on an end portion. A lens is disposed within the housing, wherein the lens and the opening define an axis of viewing. A fiber position assembly is mounted to the housing. The fiber position assembly includes a tube having a first axial end portion and a second axial end portion. An inner diameter of the first axial end portion is larger than an inner diameter of the second axial end portion. The inner diameters of the first and second axial end portions of the tube define an inner passage, wherein a longitudinal axis of the inner passage is about perpendicular to the axis of viewing.

21 Claims, 11 Drawing Sheets

OPTICAL FIBER INSPECTION TOOL

TECHNICAL FIELD

The present invention relates to field inspection tools, and more particularly to field inspection tools used to inspect the ends of optical fibers.

BACKGROUND

Fiber optic cables are widely used to transmit light signals for high-speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stress applied to the cables during installation and thereafter. Outer jackets provide protection against damage caused by crushing, abrasions, and other physical damage, as well as chemical damage (e.g., ozone, alkali, acids).

Fiber optic networks include a plurality of fiber optic cables. Often times in these fiber optic networks, the fiber optic cables require terminations. One type of termination frequently used is a mechanical splice. As is well known to those skilled in the art, a mechanical splice is a joint created between two optical fibers of a fiber optic network wherein the optical fibers are aligned by a mechanical means. Typically, a field termination uses a pre-terminated, optically polished connector having an optical fiber that was cleaved and inserted into one end of a mechanical alignment splice. This optical fiber is normally cleaved in a clean and controlled environment. The optical fiber that is inserted into the other end of the mechanical alignment splice, however, is typically terminated in the field.

It is desirable in fiber optic networks that the amount of optical power lost through the network is minimized. As mechanical splices are often included in a fiber optic network, the optical power lost through these splices should be minimized to have an optimal system. One reason for optical power losses in mechanical splices is the inclusion of a "fiber lip" on one of the end faces of the optical fibers being coupled. As will be described in more detail subsequently, a fiber lip is located on the outer circumference of the end face of an optical fiber and is often the result of a poor cleave. If a fiber lip is present on an end face of an optical fiber, poor alignment between that end face and an end face of another optical fiber will result. This poor alignment will in turn result in increased optical power losses through that splice.

Another reason for optical power losses in mechanical splices is due to contamination on the end faces of the optical fibers. If the end faces of the optical fibers have contaminants, including but not limited to dirt, dust, or glass particles or fibers, these contaminants will disturb the light being transmitted through the optical fiber and/or potentially scratch the end face of the fiber.

As optical power loss is critical, field methods are frequently used to determine the effectiveness of the mechanical splice. These field methods determine the effectiveness of the mechanical splice by the amount of light that passes through the mechanical splice. One problem with these field methods, however, is that these methods require the optical fiber end that was terminated in the field to be inserted into the mechanical splice in order for the quality of the field termination to be determined. If the field termination is of poor quality, the mechanical splice, in which the poor quality field termination was inserted, may be damaged, thereby making a low optical power loss splice impossible.

SUMMARY

An aspect of the disclosure relates to an optical fiber inspection device having a housing, which defines an opening disposed on an end portion. An axis of viewing is defined by a lens, which is disposed within the housing, and the opening. An inner passage, which defines a longitudinal axis that is perpendicular to the axis of viewing, is disposed in the housing.

Another aspect of the disclosure relates to an optical fiber inspection device having a housing, which defines an opening disposed on an end portion. An axis of viewing is defined by a lens, which is disposed within the housing, and the opening. A fiber position assembly is mounted to the housing. The fiber position assembly includes a tube having a first axial end portion with an inner diameter and a second axial end portion with an inner diameter. The inner diameter of the first axial end portion is larger than the inner diameter of the second axial end portion. The inner diameter of the first axial end portion and the inner diameter of the second axial end portion define an inner passage that has a longitudinal axis that is about perpendicular to the axis of viewing.

Another aspect of the disclosure relates to a method for inspecting an optical fiber cleave. An optical fiber of a fiber optic cable is cleaved. An end of the optical fiber is inserted into an optical fiber inspection device, which includes a housing having an opening disposed on an end portion, a lens disposed in the housing, an axis of viewing defined by the lens and the opening in the housing, and a fiber position assembly mounted to the housing that defines an inner passage with a longitudinal axis that is about perpendicular to the axis of viewing. The optical fiber is viewed through the opening in the housing to assess the condition of the end surface and the length of the end of the optical fiber.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to further explain the principles of the invention. Other aspects of the present invention and many of the attendant advantages of the present invention will be readily appreciated as the present invention becomes better understood by reference to the following Detailed Description when considered in connection with the accompanying drawings, and wherein.

DETAILED DESCRIPTION

Reference will now be made in detail to the exemplary aspects of the present invention that are illustrated in the accompanying drawings. Wherever possible, the same reference numbers will be used through out the drawings to refer to the same or like parts.

Figure 1:
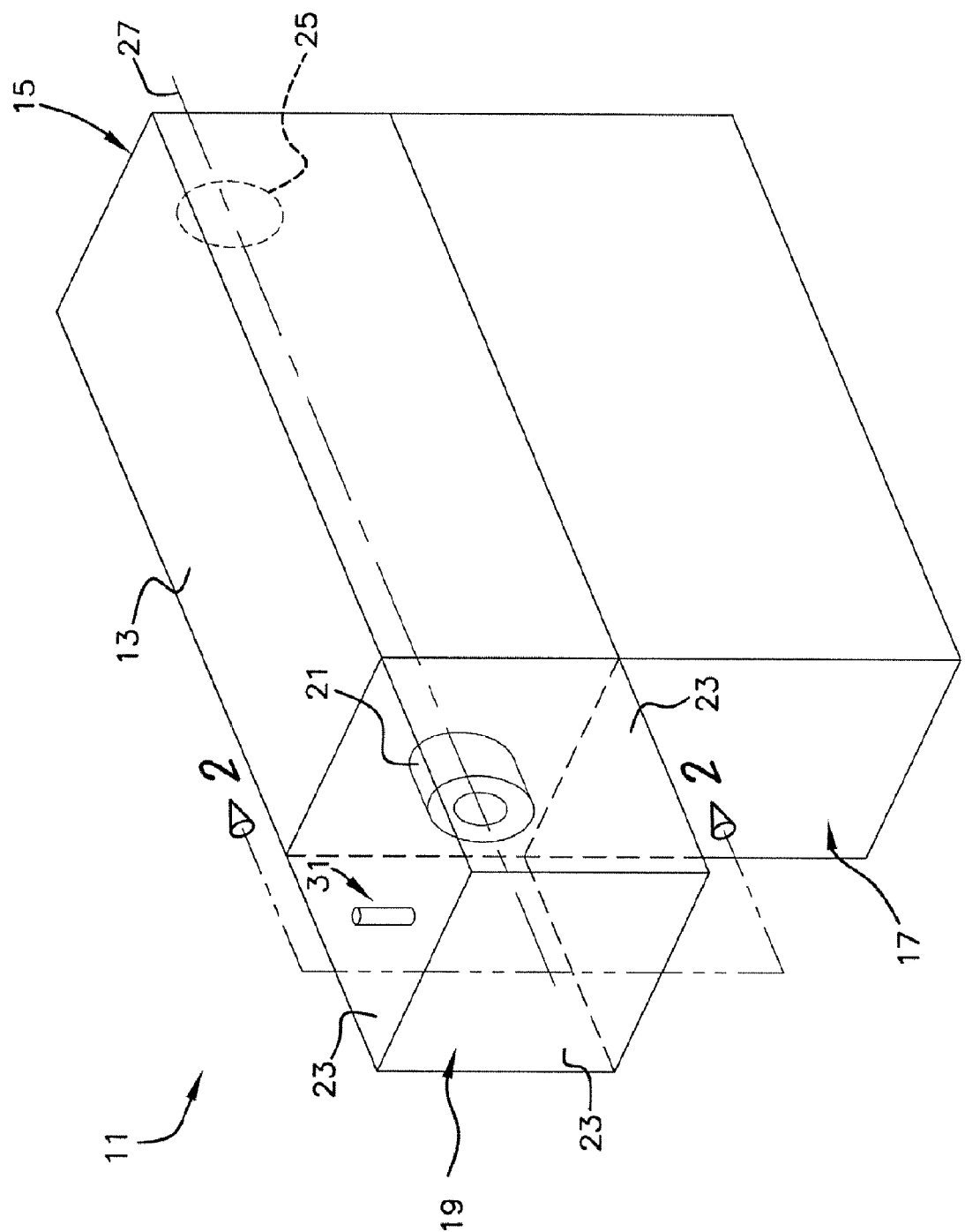
FIG. 1 is a perspective view of an optical fiber inspection device made in accordance with the present invention.

Referring now to FIG. 1, an optical fiber inspection device, generally designated 11, is shown. The optical fiber inspection device 11 includes a housing 13 having a first end portion 15, a second end portion 17, and a viewing portion 19. A lens 21 is disposed in the housing 13.

Figure 1A:
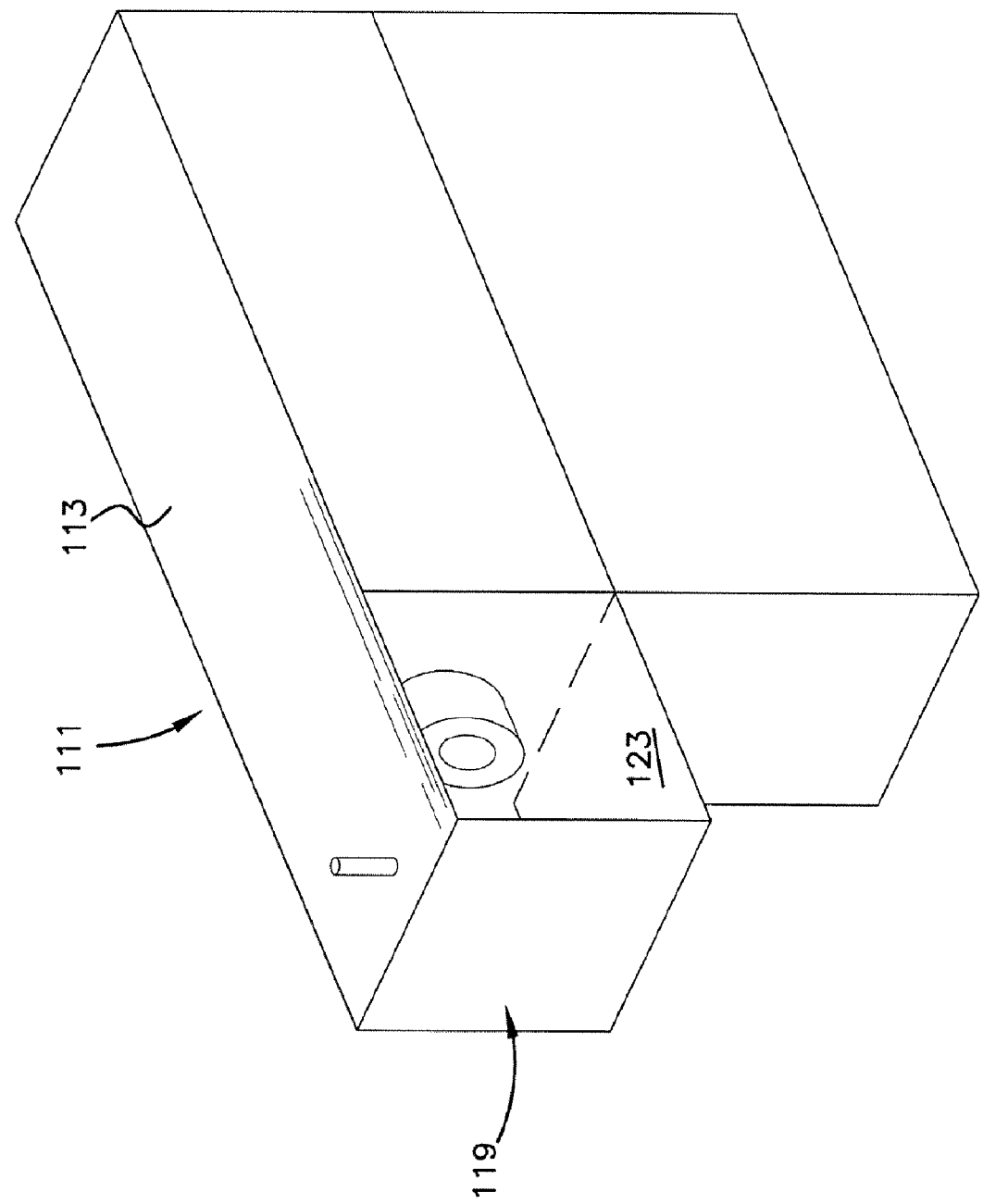
FIG. 1a is a perspective view of an alternate embodiment of an optical fiber inspection device made in accordance with the present invention.
Figure 1B:
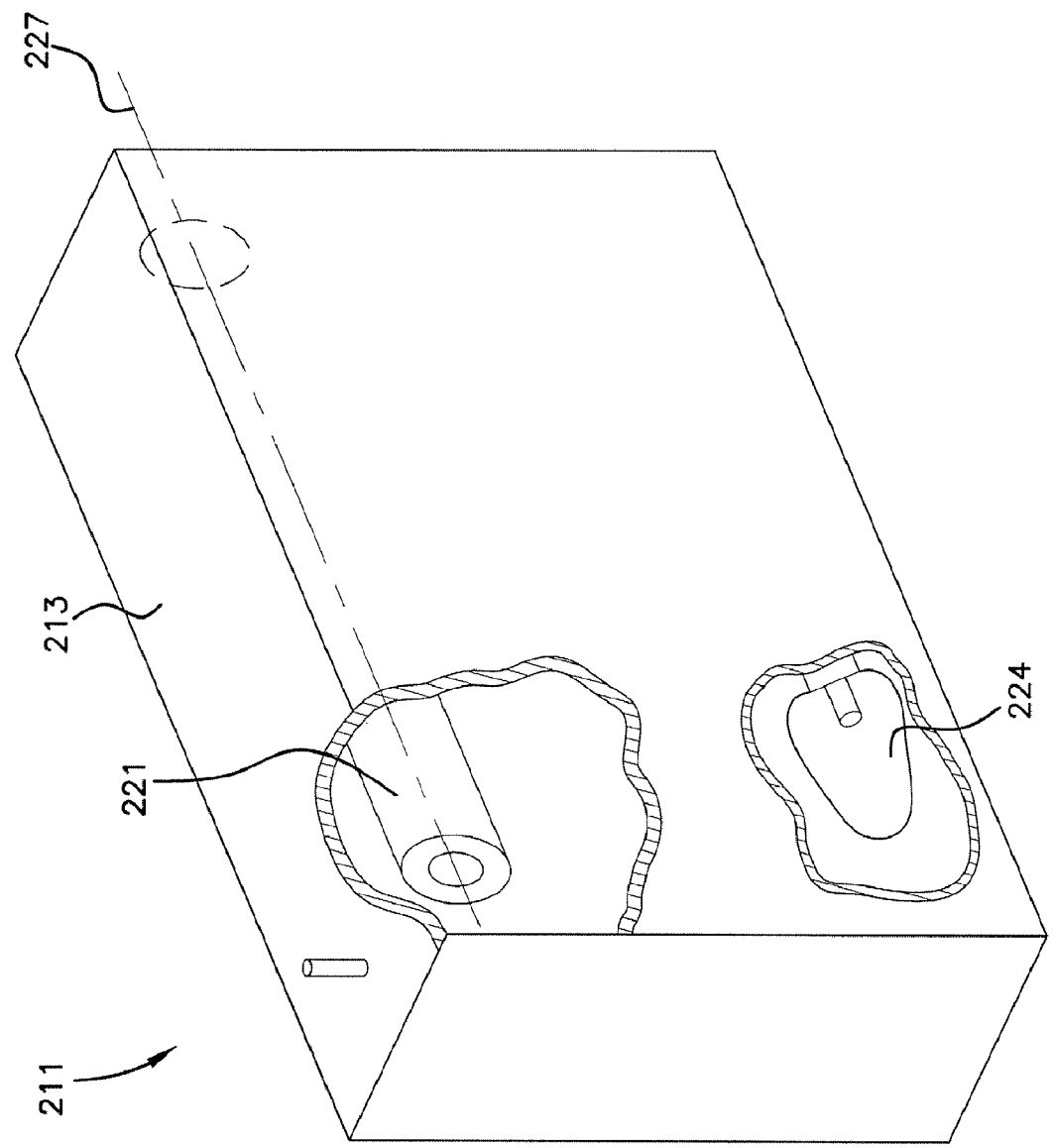
FIG. 1b is a perspective view of an alternate embodiment of an optical fiber inspection device made in accordance with the present invention.

In the subject embodiment of FIG. 1, the viewing portion 19 protrudes from the second end portion 17 of the housing 13. It will be understood by those skilled in the art, however, that the scope of the present invention is not limited to the viewing portion 19 protruding from the second end portion 17 of the housing. In a preferred embodiment, the viewing portion 19 includes at least one exterior surface 23 that is made of a material that is either transparent or translucent. This transparent or translucent material allows for the entry of light from an external light source, either natural or artificial, into the viewing portion 19. To allow greater entry of light into the viewing portion 19 of the embodiment shown in FIG. 1, five exterior surfaces 23 of the viewing portion 19 are manufactured from this transparent or translucent material. In an alternate embodiment of an optical fiber inspection device 111 shown in FIG. 1a, a housing 113 includes a viewing portion 119 in which only one of the exterior surfaces 123 is manufactured from a transparent or translucent material. It will be understood by those skilled in the art, however, that although the light source was described above as being external, the scope of the present invention is not limited to the light source being external. Referring now to FIG. 1b, an alternate embodiment of an optical fiber inspection device 211 is shown. The optical fiber inspection device 211 includes a housing 213 having a lens 221 disposed in the housing 213. Also disposed internal to the housing 213 is an artificial light source 224, which can be selectively activated using conventional techniques.

Referring again to FIG. 1, the housing 13 defines an opening 25 (shown as a hidden line in FIG. 1 with a dashed lead line to the reference numeral) in the first end portion 15, through which the lens 21 can be viewed. The lens 21 provides a magnification of objects within a field of view 26 (shown in FIGS. 5, 5a, and 5b) of the lens 21. In a preferred embodiment, the lens 21 has a magnification power in the range of 60× to 400×, although it will be understood by those skilled in the art after reviewing the present disclosure that the scope of the present invention is not limited to such magnification powers of the lens 21. In the subject embodiment, the field of view 26 has a visible diameter D (shown in FIG. 5) of approximately 2.0 mm if the magnification power of the lens 21 is 100×. If, however, the magnification power of the lens 21 is 200×, then the visible diameter D of the field of view 26 is approximately 1.0 mm. In the subject embodiment, the center of the lens 21 and the center of the opening 25 define an axis of viewing 27.

Figure 2:
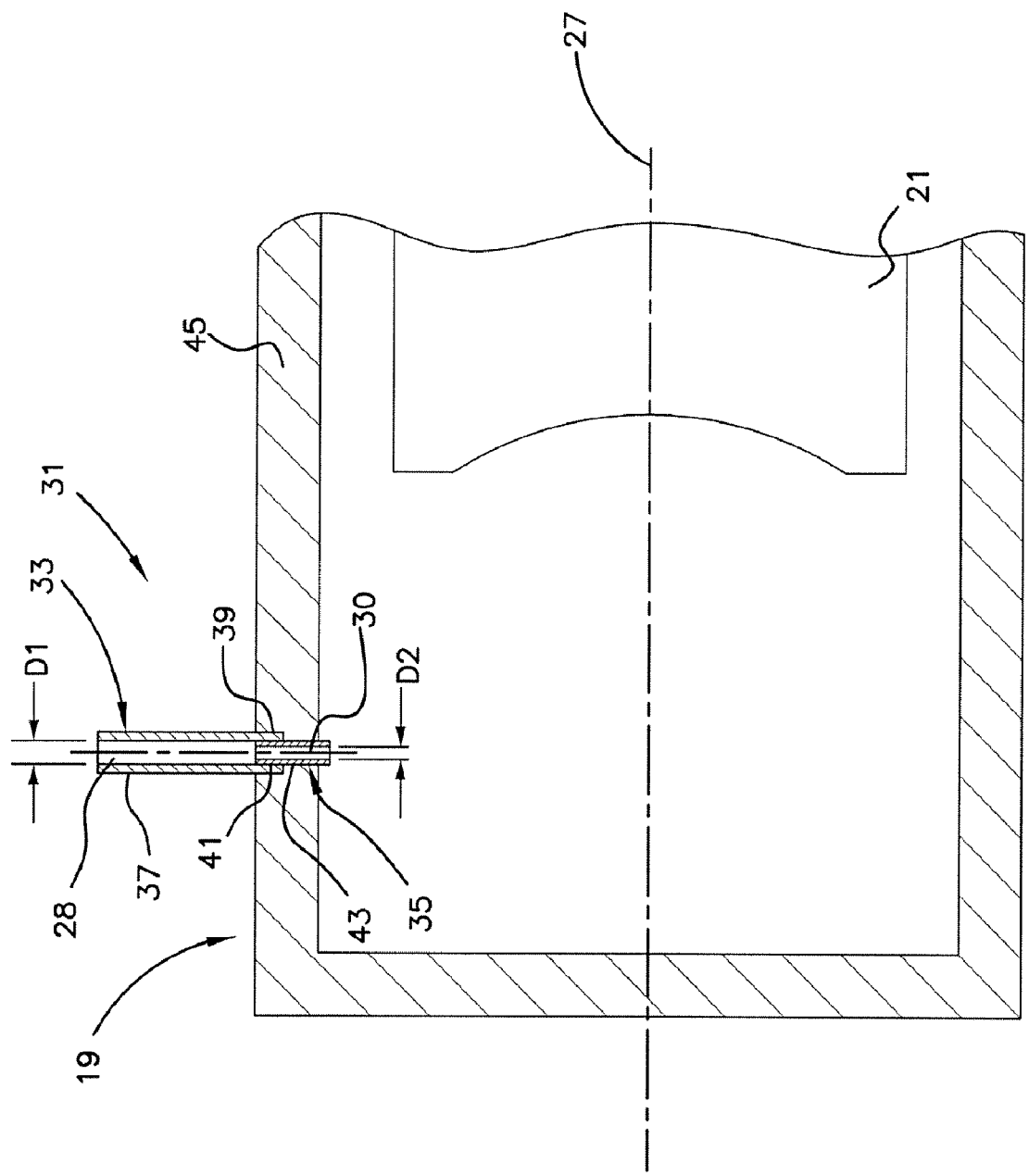
FIG. 2 is an enlarged, fragmentary cross-section of a viewing portion of the optical fiber inspection device taken on line 2-2 of FIG. 1.

Referring now to FIG. 2, an inner passage 28, which is used to present an optical fiber 29 (shown in FIG. 3) into the field of view 26 of the lens 21 for inspection purposes, is disposed in the viewing portion 19 of the housing 13. The inner passage 28 is oriented in the housing 13 of the optical fiber inspection device 11 such that a longitudinal axis 30 of the inner passage 28 is about perpendicular to the axis of viewing 27. The reason for this orientation will be described subsequently. In the subject embodiment, the inner passage 28 is defined by a fiber position assembly, generally designated 31, that is mounted to the viewing portion 19 of the housing 13.

In the subject embodiment, the fiber position assembly 31 includes two hollow tube members, a first tube, generally designated 33, and a second tube, generally designated 35. The first tube 33 has a first end portion 37, a second end portion 39, and an inner diameter D1. The second tube 35 has a first end portion 41, a second end portion 43, and an inner diameter D2, wherein the inner diameter D2 of the second tube 35 is smaller than the inner diameter D1 of the first tube 33. In the fiber position assembly 31 of the subject embodiment, the second end portion 39 of the first tube 33 is connectedly engaged with the first end portion 37 of the second tube 35 such that the inner diameter D1 of the first tube 33 is about concentric to the inner diameter D2 of the second tube 35. Through this connected engagement of the first tube 33 and the second tube 35, the inner diameters D1 and D2 cooperate to define the inner passage 28. The method of connected engagement between the second end portion 39 of the first tube 33 and the first end portion 41 of the second tube 35 would include conventional methods such as bonding, soldering, threading or press-fitting. In the preferred embodiment, the first tube 33 would be in soldered engagement with the second tube 35 using a conventional silver solder.

In the subject embodiment, the second end portion 39 of the first tube 33 and the second end portion 43 of the second tube 35 are mounted into a wall 45 of the viewing portion 19 of the housing 13. The methods of mounting the second end portion 39 of the first tube 33 and the second end portion 43 of the second tube 35 into the wall 45 would include conventional methods such as bonding, soldering, threading, or press-fitting.

Figure 2A:
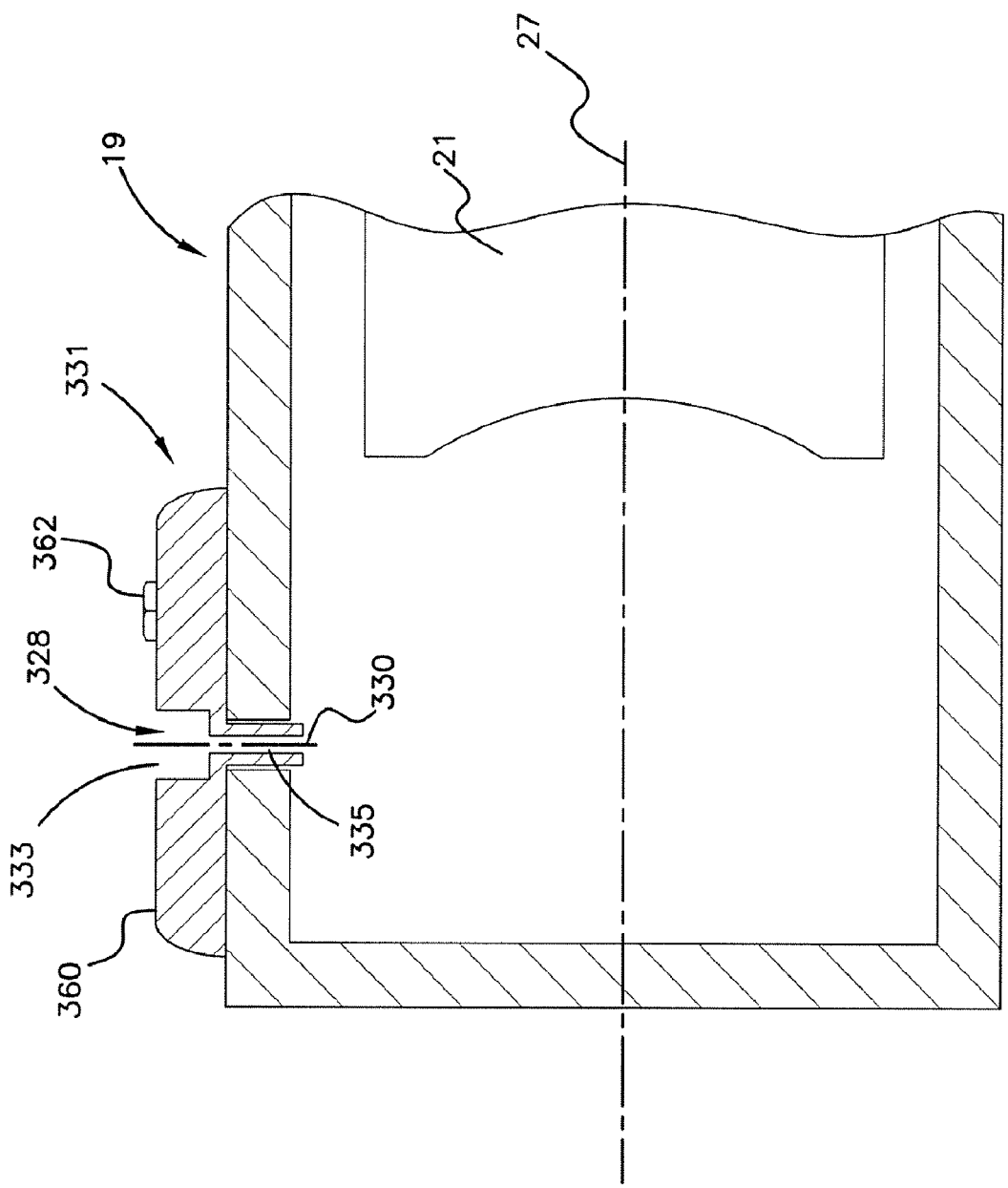
FIG. 2a is an enlarged, fragmentary cross-section of the viewing portion of FIG. 2 having an alternate embodiment of a fiber position assembly made in accordance with the present invention.

Referring now to FIG. 2a, an alternate embodiment of a fiber position assembly 331 is shown. The fiber position assembly 331 includes a mounting block 360 that is mounted to the viewing portion 19 of the optical fiber inspection device 11. The mounting block defines an inner passage 328 having a longitudinal axis 330 that is about perpendicular to the axis of viewing 27. The inner passage 328 defines a first portion 333 and a second portion 335, wherein the inner diameter of the first portion 333 is larger than the inner diameter of the second portion 335. In this alternate embodiment, the mounting block 360 is held in mounted engagement with the viewing portion 19 by a plurality of fasteners, such as bolts, 362.

This configuration of the fiber position assembly 331 allows for a different mounting block 360 to be installed to accommodate different optical fiber 29 dimensions.

Figure 2B:
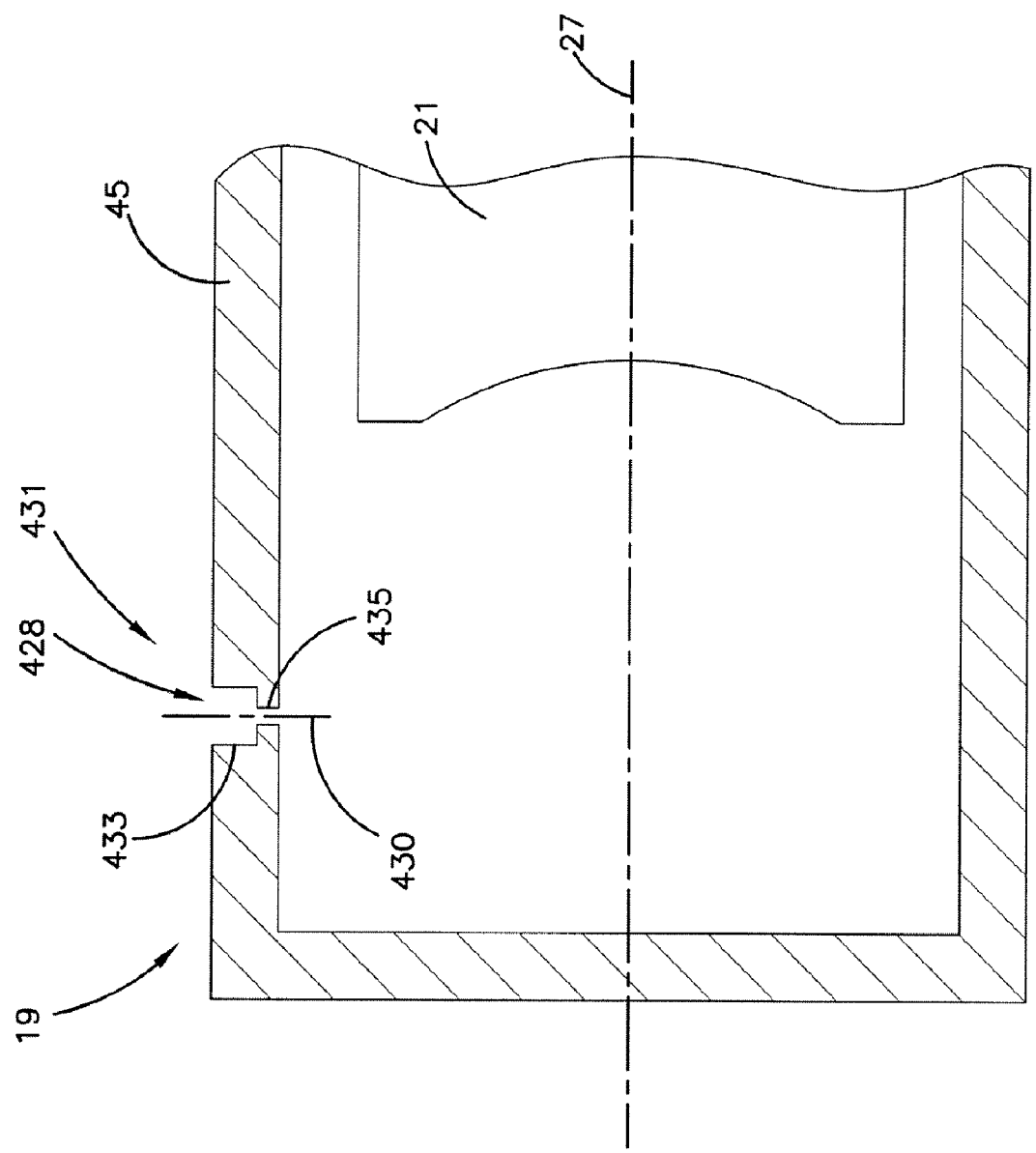
FIG. 2b is an enlarged, fragmentary cross-section of the viewing portion of FIG. 2 having an alternate embodiment of a fiber position assembly made in accordance with the present invention.

Referring now to FIG. 2b, an alternate embodiment of an inner passage 428 is shown. In this alternate embodiment, the inner passage 428 is defined by the wall 45 of the viewing portion 19 of the optical fiber inspection device 11. The inner passage 428 includes a longitudinal axis 430 that is about perpendicular to the axis of viewing 27. The inner passage 428 defines a first portion 433 and a second portion 435, wherein the inner diameter of the first portion 433 is larger than the inner diameter of the second portion 435.

Figure 2C:
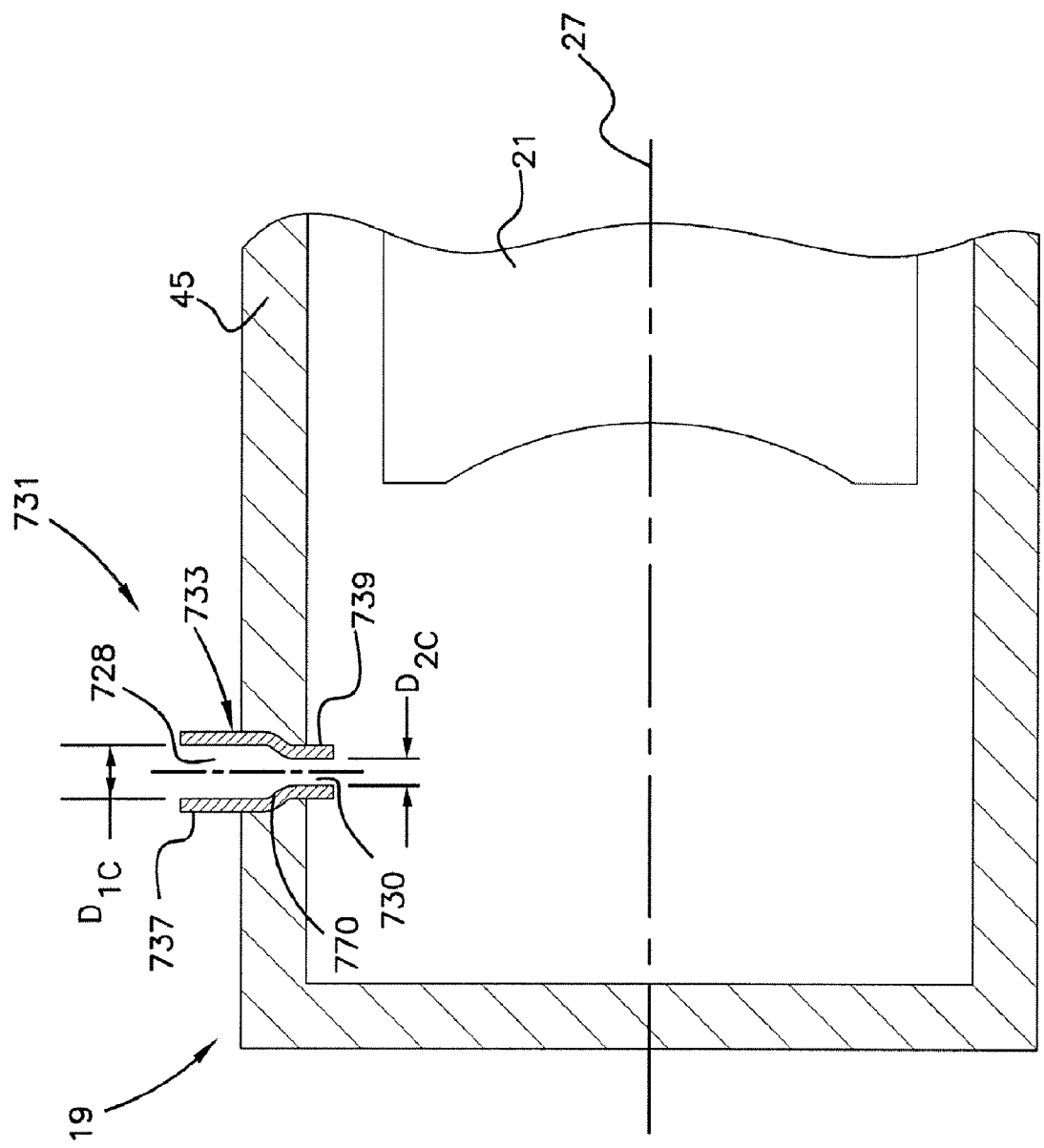
FIG. 2c is an enlarged, fragmentary cross-section of the viewing portion of FIG. 2 having an alternative embodiment of a fiber position assembly made in accordance with the present invention.

Referring now to FIG. 2c, an alternate embodiment of a fiber position assembly 731 is shown. The fiber position assembly 731 includes a tube 733 having a first axial end portion 737 with an inner diameter $D_{1c}$ and a second axial end portion 739 with an inner diameter $D_{2c}$. The inner diameter $D_{1c}$ of the first axial end portion 737 of the tube 733 is larger than the inner diameter $D_{2c}$ of the second axial end portion 739. In this alternative embodiment, the reduced inner diameter $D_{2c}$ of the second axial end portion 739 is formed by swaging the second axial end portion 739 of the tube 733, although it will be understood by those skilled in the art that other methods to reduce the inner diameter $D_{2c}$ of the second axial end portion 739, including crimping, are within the scope of the present invention. The inner diameter $D_{1c}$ of the first axial end portion 737 and the inner diameter $D_{2c}$ of the second axial end portion 739 cooperate to define an inner passage 728. The inner passage 728 includes a longitudinal axis 730 that is about perpendicular to the axis of viewing 27.

Figure 3:
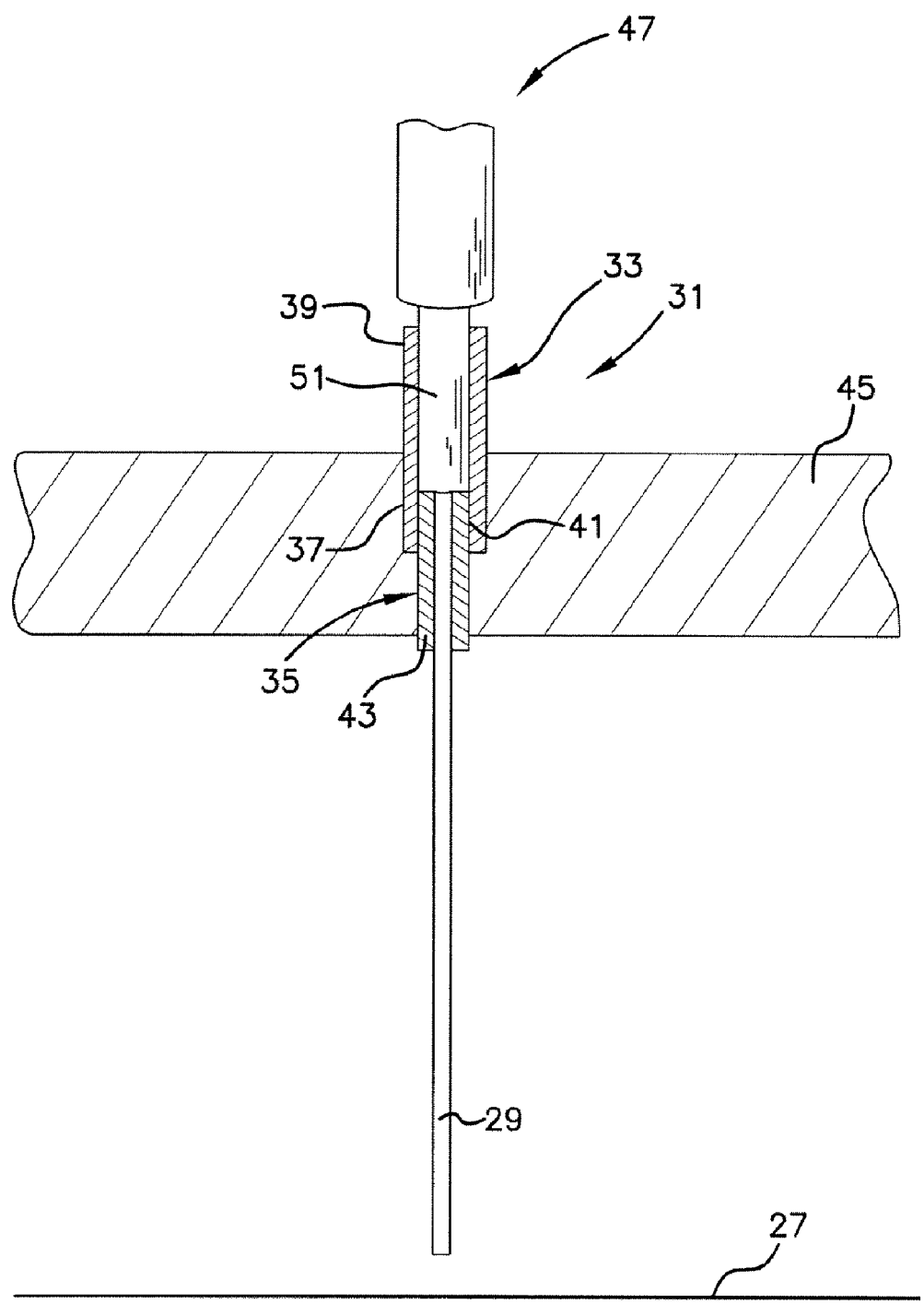
FIG. 3 is an enlarged, fragmentary cross-section of the fiber position assembly of FIG. 2.

FIG. 3 illustrates a fiber optic cable, generally designated 47, inserted into the fiber position assembly 31. The fiber optic cable 47 includes the optical fiber 29, a protective coating, and a buffer 51. It will be appreciated that the optical fiber 29 can have any number of conventional configurations. For example, the optical fiber 29 may include a silica-based core surrounded by a silica-based cladding having a lower index of refraction than the core. Typically, the outer diameter of the core and the cladding is approximately 125 µm. The optical fiber 29 includes at least one protective coating, such that the protective coating surrounds the cladding of the optical fiber 29. The protective coating is usually some type of conventional polymeric material. The outer diameter of this protective coating is approximately 245 µm or almost twice the outer diameter of the core and cladding of the optical fiber 29. The buffer 51 can have any number of conventionally known constructions. For example, the buffer 51 can be made of a polymeric material such as polyvinyl chloride (PVC). Other polymeric materials (e.g. polyethylenes, polyurethanes, polypropylenes, polyvinylidene fluorides, ethylene vinyl acetate, nylon, polyester, or other materials) may also be used. Typically, the outer diameter of the buffer 51 is approximately 900 µm.

Before, the fiber optic cable 47 can be inserted into the optical fiber inspection device 11, the fiber optic cable 47 must be stripped and cleaved using conventional techniques. A precise stripper is usually used to remove the buffer 51 and the protective coating from the fiber optic cable 47. Having stripped the buffer 51 and the protective coating from a portion of the fiber optic cable 47, the optical fiber 29 is exposed. With the optical fiber 29 exposed, the optical fiber 29 is scribed and cleaved.

Figure 4:
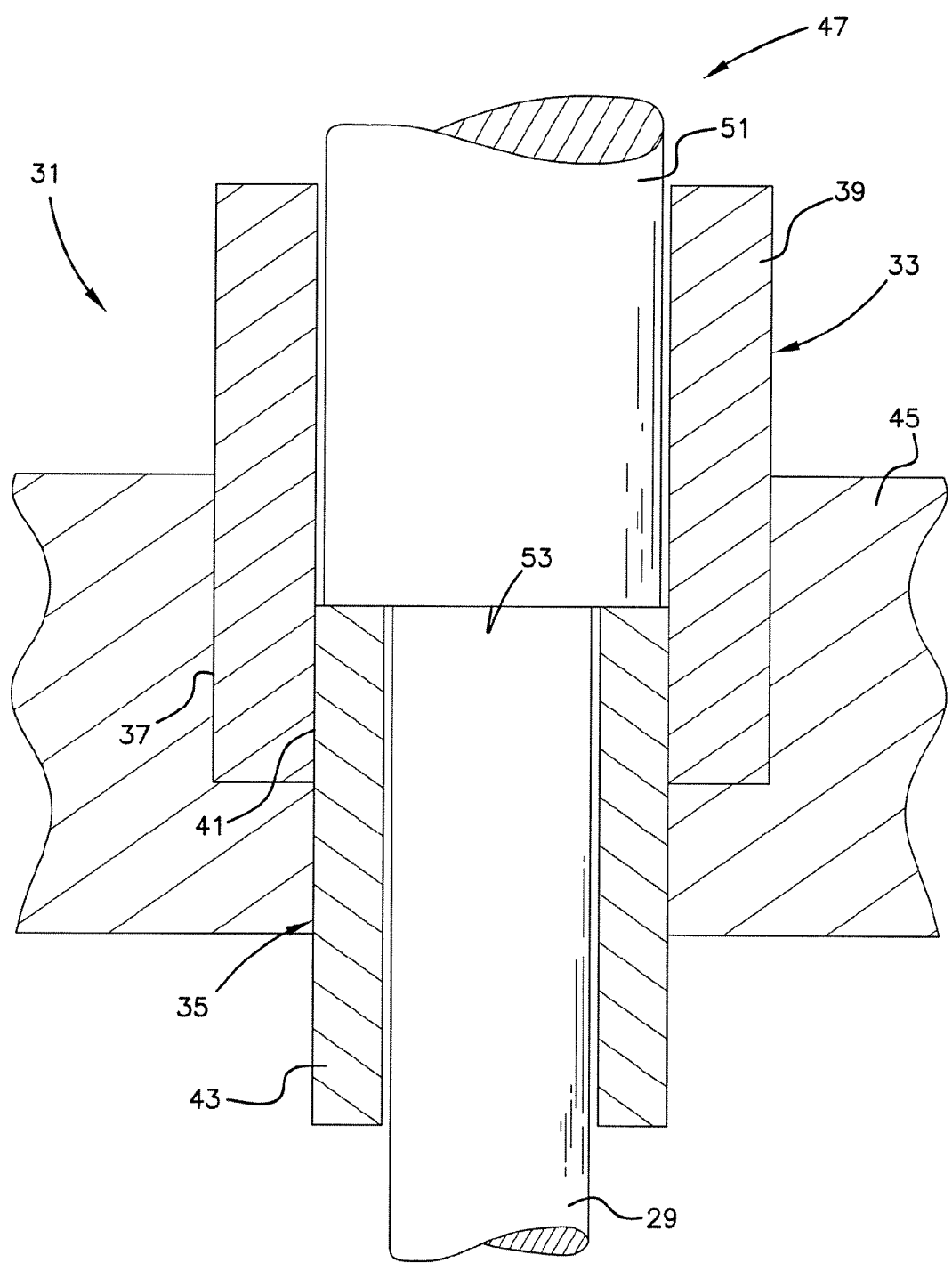
FIG. 4 is an enlarged, fragmentary cross-section of the fiber position assembly of FIG. 2.

Referring now to FIG. 4, after the optical fiber 29 has been cleaved, the fiber optic cable 47 is ready to be inserted into inner passage 28 of the optical fiber inspection device 11. In the subject embodiment, the optical fiber 29 is inserted through the inner diameters D1 and D2 of the first and second tubes 33 and 35, respectively, of the fiber position assembly 31. The inner diameter D2 of the second tube 35 is slightly larger than the outer diameter of the optical fiber 29. By way of example only, if the outer diameter of the optical fiber 29 is approximately 125 µm, the inner diameter of the tube would be approximately 175 µm. The clearance between the inner diameter D2 of the second tube 35 and the outer diameter of the optical fiber 29 allows for the optical fiber 29 to be easily passed through the second tube 35 without damage to the optical fiber 29.

As the optical fiber 29 passes through the inner diameter D2 of the second tube 35, the buffer 51 enters the inner diameter D1 of the first tube 39, wherein the inner diameter D1 of the first tube 33 is slightly larger than the outer diameter of the buffer 51. By way of example only, if the outer diameter of the buffer 51 is approximately 900 µm, the inner diameter D1 of the first tube 33 would be approximately 1.0 mm. The clearance between the inner diameter D1 of the first tube 33 and the outer diameter of the buffer 51 allows for the buffer 51 to be easily passed through the first tube 33 without damage to the buffer 51. The buffer 51 defines an end 53 formed from the stripping procedure briefly described above. The buffer 51 is, therefore, passed through the first tube 33 until the end 53 abuts the first end portion 41 of the second tube 35. When the end 53 of the buffer 51 abuts the first end portion 41 of the second tube 35, fiber optic cable 47 is properly positioned in the inner passage 28 of the optical fiber inspection device 11. In the alternative embodiment shown in FIG. 2c, the buffer 51 would pass through the inner passage 728 of the tube 733 until the end 53 abuts a narrowing region 770 disposed between the first axial end portion 737 and the second axial end portion 739 of the tube 733.

Figure 5:
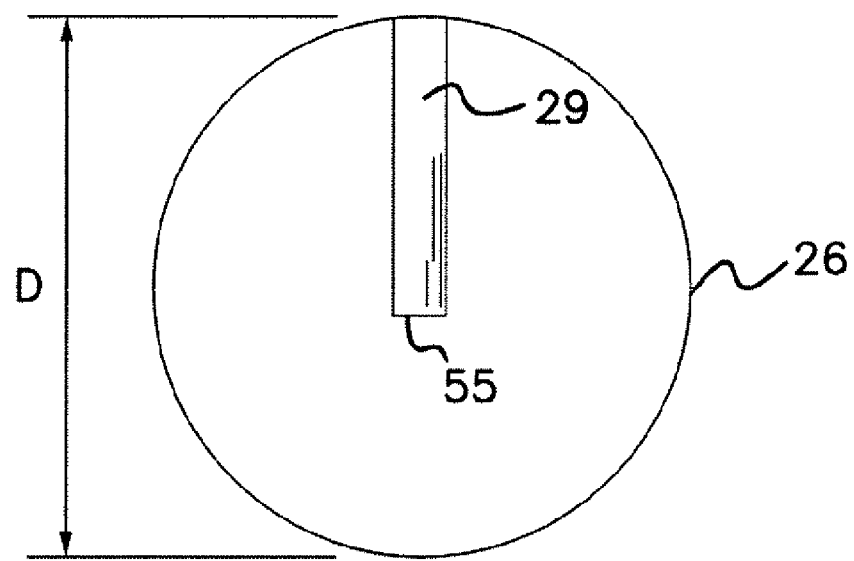
FIG. 5 is a view of an optical fiber end as viewed through the lens of the optical fiber inspection device of FIG. 1.

Referring now to FIG. 5, the optical fiber 29 is shown in the field of view 28 of the lens 21. As the inner passage 28 is oriented such that the longitudinal axis 30 is about perpendicular to the axis of viewing 27, a side view of the optical fiber 29 is shown in the field of view 26 of the lens. This orientation of the inner passage 28 with respect to the axis of viewing 27 is advantageous as it allows the user of the optical fiber inspection device 11 to not only determine the condition of an end surface 55 of the optical fiber 29 but also to assess whether the cleaved end of the optical fiber 29 is of proper axial length for insertion into the mechanical splice. The axial length of the cleaved end of the optical fiber 29 is assessed by whether the end surface 55 is viewable in the field of view 26. For example, in FIG. 5, the end surface 55 of the optical fiber 29 is shown in the field of view 26 to be free of fiber lips or any contamination, both of which can result in optical power loss as described above. Also, as the end surface 55 of the optical fiber 31 is viewable within the field of view 26 of the lens 21 when the end 53 of the buffer 51 is abutting the first end portion 41 of the second tube 35, the user of the optical fiber inspection device 11 would know that the optical fiber 29 is a proper length to be inserted into the mechanical splice.

Figure 5A:
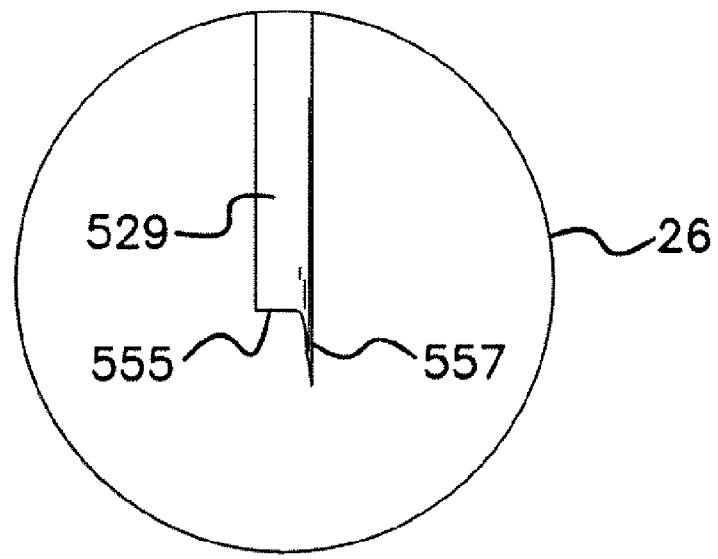
FIG. 5a is an alternate embodiment of a view of an optical fiber end as viewed through the lens of the optical fiber inspection device of FIG. 1.

Referring now to FIG. 5a, an alternate embodiment of an optical fiber 529 is shown in the field of view 26 of the optical fiber inspection device 11. In this alternate embodiment, an end surface 555 of the optical fiber 529 is shown in the field of view 26 with a fiber lip 557. While the user of the optical fiber inspection device 11 would know that the axial length of the cleaved end of the optical fiber 529 was appropriate since the end surface 555 could be seen in the field of view 26, the user would know not to insert this optical fiber 529 into a mechanical splice due to the fiber lip 557 protruding from the end surface 555. Before installing the optical fiber 529 into the mechanical splice, the end surface 555 must be polished in order to remove the fiber lip 557.

Figure 5B:
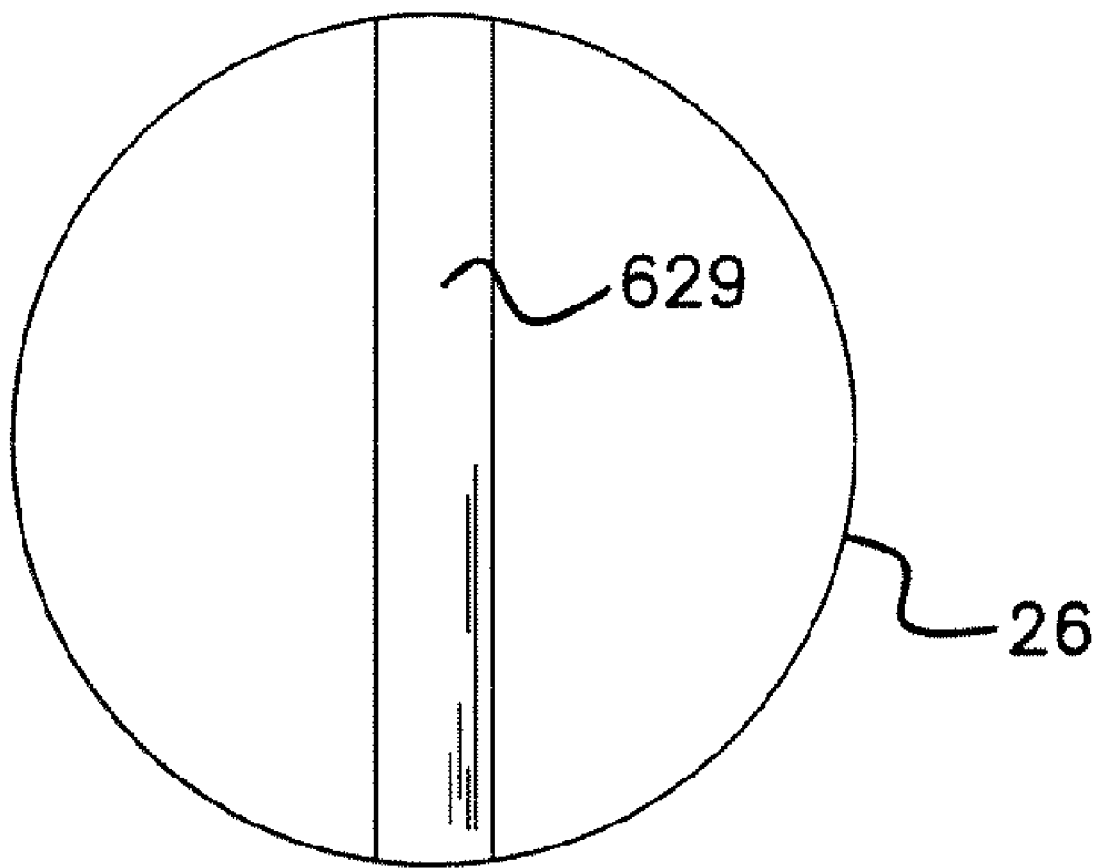
FIG. 5b is an alternate embodiment of a view of an optical fiber end as viewed through the lens of the optical fiber inspection device of FIG. 1.

Referring now to FIG. 5b, an alternate embodiment of an optical fiber 629 is shown in the field of view 26 of the optical fiber inspection device 11. In this alternate embodiment, the optical fiber 629 takes up the entire lengthwise view of the field of view 26. In other words, an end surface of the optical fiber 629 is not shown in the field of view 26. As a result, the user of the optical fiber inspection device 11 would know that the axial length of the cleaved end of the optical fiber 629 is not proper for insertion into a mechanical splice. This optical fiber 629 would need to be scribed, cleaved, and inspected again before being inserted into the mechanical splice.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An optical fiber inspection device comprising:
    a housing having an opening disposed on an end portion;
    a lens disposed in the housing, wherein the lens and the opening define an axis of viewing; and
    an inner passage in the housing having a longitudinal axis that is about perpendicular to the axis of viewing, wherein the inner passage is adapted to receive an optical fiber so that an end portion of the optical fiber is in a field of view of the lens.

2. An optical fiber inspection device as claimed in claim 1, wherein the inner passage is defined by a fiber position assembly having a first tube and a second tube being concentrically engaged, with the first tube having a larger inner diameter than an inner diameter of the second tube.

3. An optical fiber inspection device comprising:
    a housing having an opening disposed on an end portion;
    a lens disposed in the housing, wherein the lens and the opening define an axis of viewing; and
    an inner passage in the housing having a longitudinal axis that is about perpendicular to the axis of viewing, the inner passage being defined by a fiber position assembly including a tube having a first axial end portion and a second axial end portion, wherein an inner diameter of the second axial end portion is smaller than an inner diameter of the first axial end portion.

4. An optical fiber inspection device as claimed in claim 3, wherein the second axial end portion of the tube is swaged.

5. An optical fiber inspection device as claimed in claim 3, wherein the second axial end portion of the tube is crimped.

6. An optical fiber inspection device as claimed in claim 1, wherein the housing includes a viewing portion having at least one exterior surface being of a material of the type selected from the group consisting of translucent and transparent.

7. An optical fiber inspection device as claimed in claim 6, wherein the inner passage is disposed in the viewing portion of the housing.

8. An optical fiber inspection device as claimed in claim 6, wherein the viewing portion extends from a second end portion of the housing.

9. An optical fiber inspection device as claimed in claim 1, further comprising a light source disposed within the housing.

10. An optical fiber inspection device as claimed in claim 1, wherein the inner passage is defined by a fiber position assembly including a mounting block that is mounted to the housing.

11. An optical fiber inspection device as claimed in claim 1, wherein the lens has a magnification power in the range of 60× to 400×.

12. An optical fiber inspection device comprising
    a housing having an opening disposed on an end portion;
    a lens disposed in the housing, wherein the lens and the opening define an axis of viewing; and
    a fiber position assembly mounted to the housing, wherein the fiber position assembly includes a tube having a first axial end portion and a second axial end portion, wherein an inner diameter of the first axial end portion is larger than an inner diameter of the second axial end portion, with the inner diameter of the first axial end portion and the inner diameter of the second axial end portion defining an inner passage having a longitudinal axis that is about perpendicular to the axis of viewing.

13. An optical fiber inspection device as claimed in claim 12, wherein the second axial end portion of the tube is swaged.

14. An optical fiber inspection device as claimed in claim 12, wherein the second axial end portion of the tube is crimped.

15. An optical fiber inspection device as claimed in claim 12, wherein the housing includes a viewing portion having at least one exterior surface being of a material of the type selected from the group consisting of translucent and transparent.

16. An optical fiber inspection device as claimed in claim 15, wherein the inner passage is disposed in the viewing portion of the housing.

17. An optical fiber inspection device as claimed in claim 15, wherein the viewing portion extends from a second end portion of the housing.

18. An optical fiber inspection device as claimed in claim 12, further comprising a light source disposed in the housing.

19. An optical fiber inspection device as claimed in claim 12, wherein the lens has a magnification power in the range of 60× to 400×.

20. A method for inspecting an optical fiber cleave comprising the steps of:
    cleaving an optical fiber of a fiber optic cable;
    inserting a cleaved end of the optical fiber into an optical fiber inspection device, wherein the optical fiber inspection device includes:
    a housing having an opening disposed on an end portion;
    a lens disposed in the housing, wherein the lens and the opening define an axis of viewing;
    a fiber position assembly mounted to the housing, wherein the fiber position assembly defining an inner passage having a longitudinal axis that is about perpendicular to the axis of viewing; wherein the inner passage is adapted to receive the optical fiber so that the cleaved end of the optical fiber is in a field of view of the lens; and
    viewing the optical fiber through the opening in the housing to assess surface conditions of the cleaved end and an axial length of the cleaved end of the optical fiber.

21. A method for inspecting an optical fiber cleave comprising:
    providing an optical fiber inspection device having a housing defining an opening and a lens disposed in the housing, the lens and the opening defining an axis of viewing, the housing having an inner passage defining a longitudinal axis that is about perpendicular to the axis of viewing;
    cleaving an optical fiber of a fiber optic cable;
    inserting a cleaved end of the optical fiber through the inner passage of the optical fiber inspection device so that the cleaved end of the optical fiber is in a field of view of the lens; and
    viewing the optical fiber through the opening in the housing.

* * * * *